US012331531B2

(12) United States Patent
Helmer

(10) Patent No.: US 12,331,531 B2
(45) Date of Patent: Jun. 17, 2025

(54) DISPOSAL CHUTE

(71) Applicant: Chad Helmer, Battle Ground, WA (US)

(72) Inventor: Chad Helmer, Battle Ground, WA (US)

( * ) Notice: Subject to any disclaimer, the term of this patent is extended or adjusted under 35 U.S.C. 154(b) by 129 days.

(21) Appl. No.: 18/128,911

(22) Filed: Mar. 30, 2023

(65) Prior Publication Data

US 2024/0328173 A1 Oct. 3, 2024

(51) Int. Cl.
*E04F 17/12* (2006.01)
*B65G 11/02* (2006.01)
*B65G 11/18* (2006.01)

(52) U.S. Cl.
CPC .............. *E04F 17/12* (2013.01); *B65G 11/02* (2013.01); *B65G 11/026* (2013.01); *B65G 11/186* (2013.01)

(58) Field of Classification Search
CPC ........ B65F 1/1431; E04F 17/12; B65G 11/02; B65G 11/026; B65G 11/186
USPC .............................................. 193/14, 34, 2 A
See application file for complete search history.

(56) References Cited

U.S. PATENT DOCUMENTS

| | | | |
|---|---|---|---|
| 1,886,793 A * | 11/1932 | Davidson | B65G 11/186 193/34 |
| 2,658,603 A * | 11/1953 | Fernald | B22C 5/14 222/459 |
| 3,627,090 A | 12/1971 | Dickey | |
| 4,640,403 A * | 2/1987 | McDermott | B65G 11/083 193/34 |
| D296,834 S | 7/1988 | McDermott | |
| 5,090,546 A | 2/1992 | McDermott | |
| 5,695,115 A | 12/1997 | Shantzis | |
| 7,581,629 B2 | 9/2009 | Kohler | |
| 7,971,698 B2 * | 7/2011 | Burstrom | B65G 11/083 193/25 E |
| 9,296,562 B1 | 3/2016 | Van Bogaert | |
| 10,259,652 B1 * | 4/2019 | Bisson | B65G 11/186 |

FOREIGN PATENT DOCUMENTS

| | | | |
|---|---|---|---|
| AU | 2018101155 A4 * | 9/2018 | ............. B65G 11/02 |
| WO | WO9738922 | 10/1997 | |
| WO | WO-2008031173 A1 * | 3/2008 | ........... B65G 11/026 |

* cited by examiner

*Primary Examiner* — James R Bidwell

(57) ABSTRACT

A disposal chute assembly for directing debris downwardly to a destination area such as a dumpster includes a plurality of chute sections. Each chute section has a tubular shape, and the chute sections are removably interconnected to define a channel extending from a topmost chute section to a bottommost chute section. Each chute section has a top end and a bottom end. Each chute section of the plurality of chute sections comprises a tube including a plurality of panels that are removably interconnected. Each panel of the plurality of panels extend from the top end to the bottom end of the chute section.

19 Claims, 11 Drawing Sheets

DISPOSAL CHUTE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to chute devices and more particularly pertains to a new chute device for directing debris downwardly to a destination area such as a dumpster.

(2) Description of Related Art Including Information Disclosed Under 37 CFR 1.97 and 1.98

The prior art describes myriad chute devices for directing debris downwardly to a destination area. These chute devices are often used in the construction industry to quickly dispose of debris taken from upper floors and roofs of buildings. These disposal chutes typically use a plurality of interchangeable chute sections which are serially interconnected to form the chute. When a chute section becomes damaged from regular wear or other interferences, it can be replaced by another chute section. Often, however, only a portion of a chute section is damaged. So, replacing an entire chute section is wasteful. To reduce the waste of undamaged portions of a chute section, an alternative design is needed which makes it possible to replace only a damaged portion of a chute section.

BRIEF SUMMARY OF THE INVENTION

An embodiment of the disclosure meets the needs presented above by generally comprising a plurality of chute sections. Each chute section has a tubular shape, and the chute sections are removably interconnected to define a channel extending from a topmost chute section to a bottommost chute section. Each chute section has a top end and a bottom end. Each chute section of the plurality of chute sections comprises a tube including a plurality of panels that are removably interconnected. Each panel of the plurality of panels extend from the top end to the bottom end of the chute section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
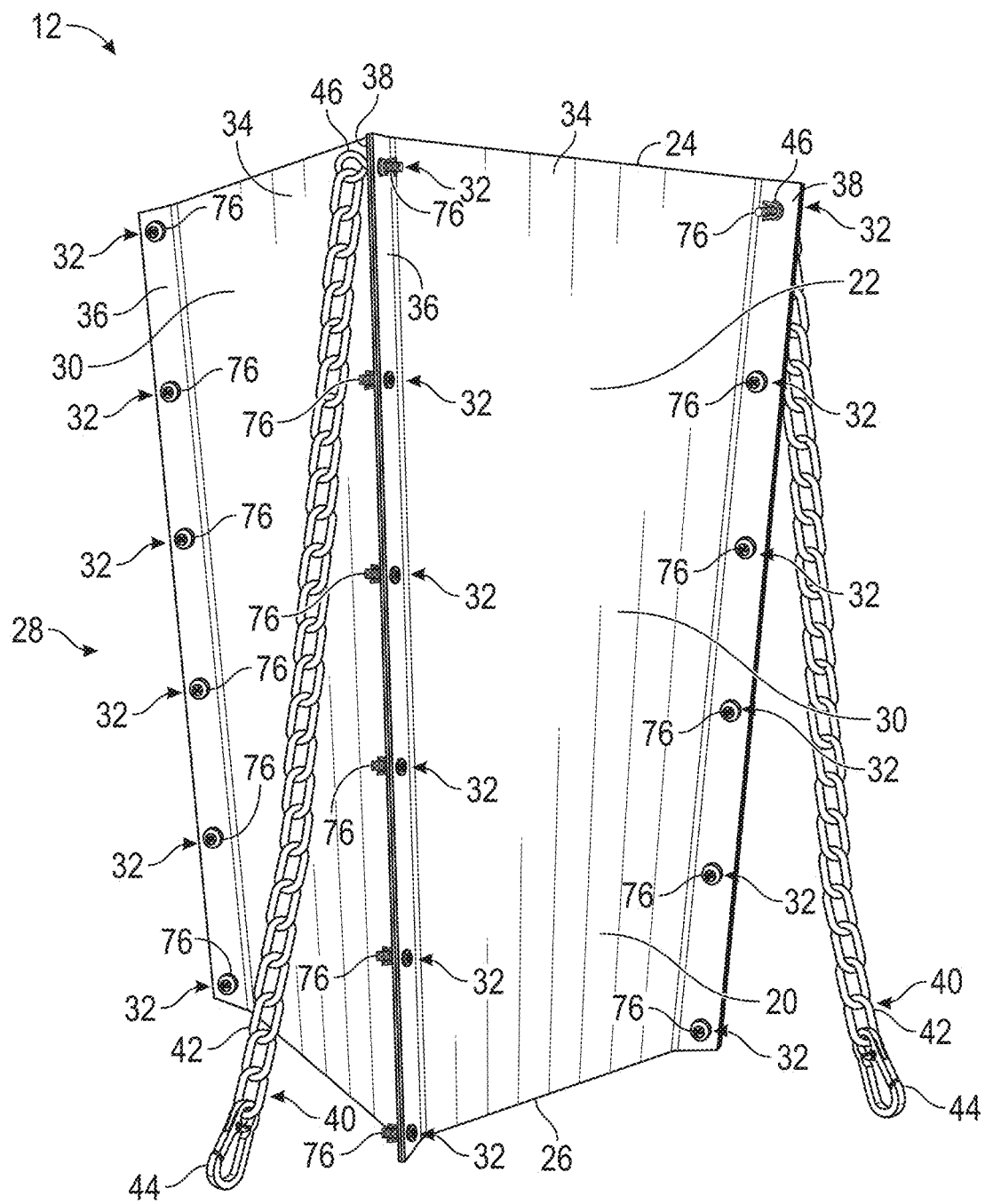
FIG. 1 is a perspective view of a chute section of a disposal chute assembly according to an embodiment of the disclosure.
Figure 2:
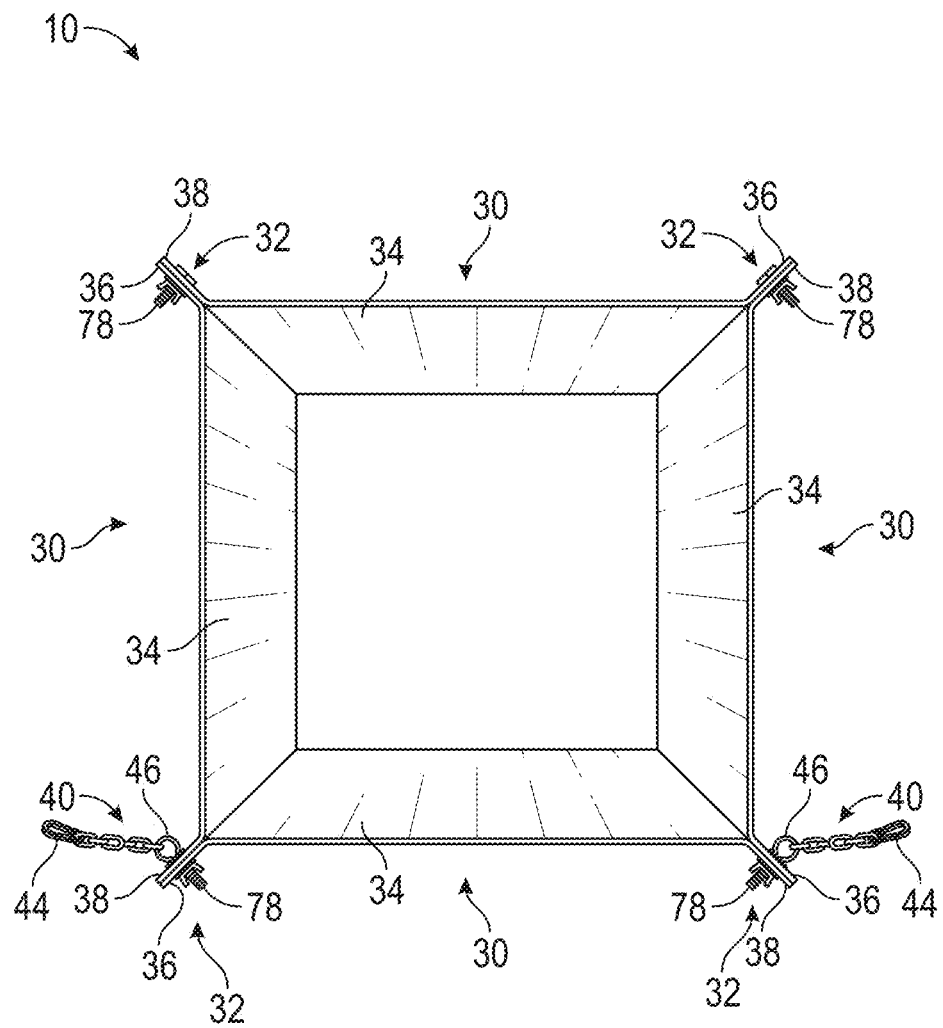
FIG. 2 is a top view of a chute section of an embodiment of the disclosure.
Figure 3:
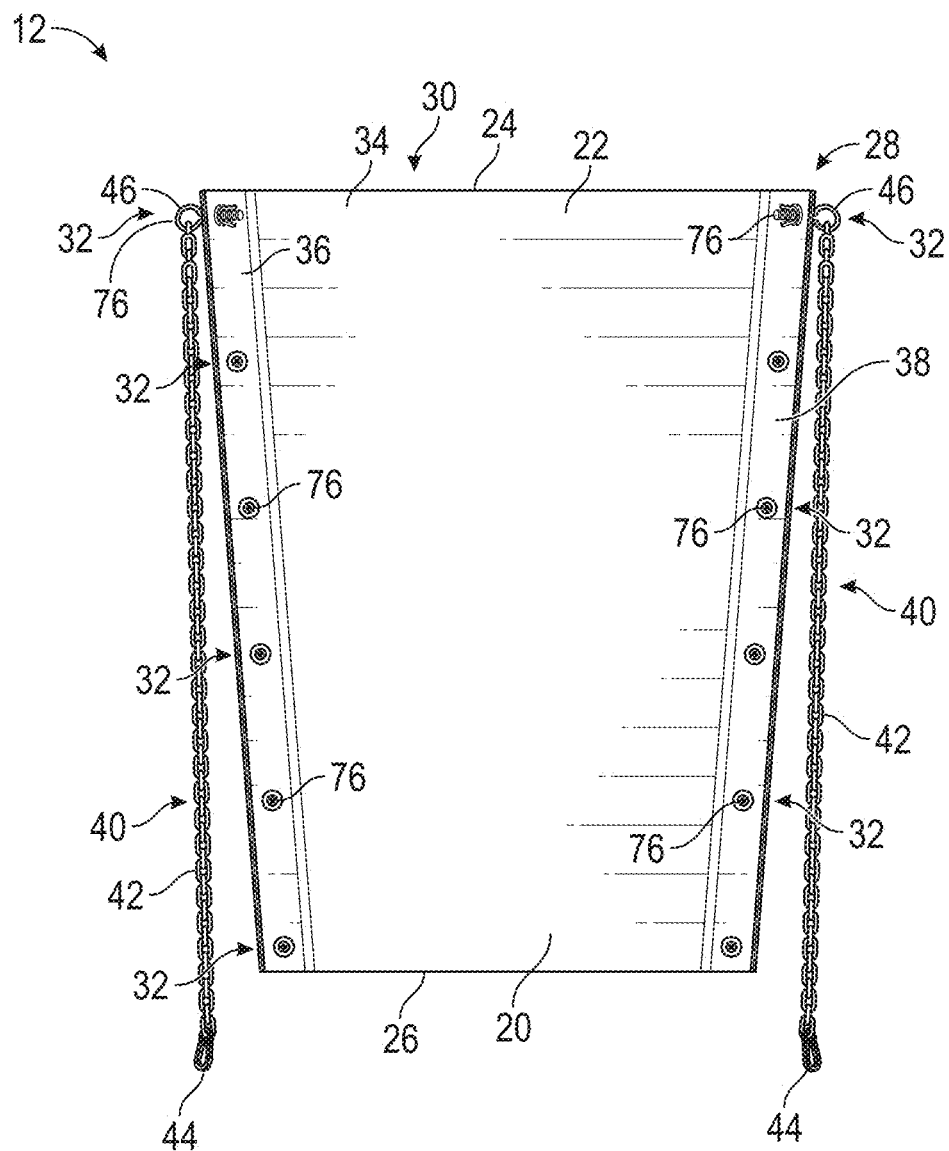
FIG. 3 is a front view of a chute section of an embodiment of the disclosure.
Figure 4:
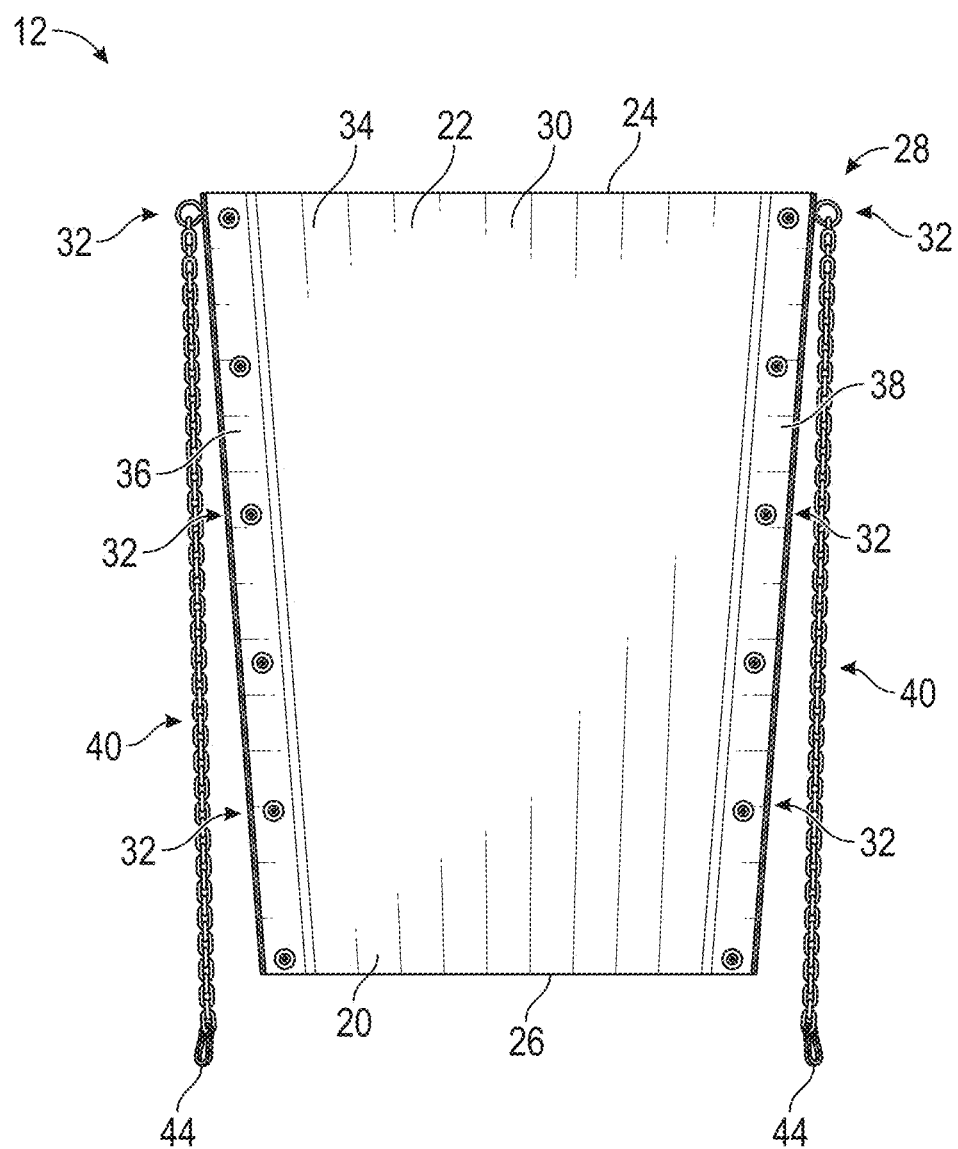
FIG. 4 is a rear view of a chute section of an embodiment of the disclosure.
Figure 5:
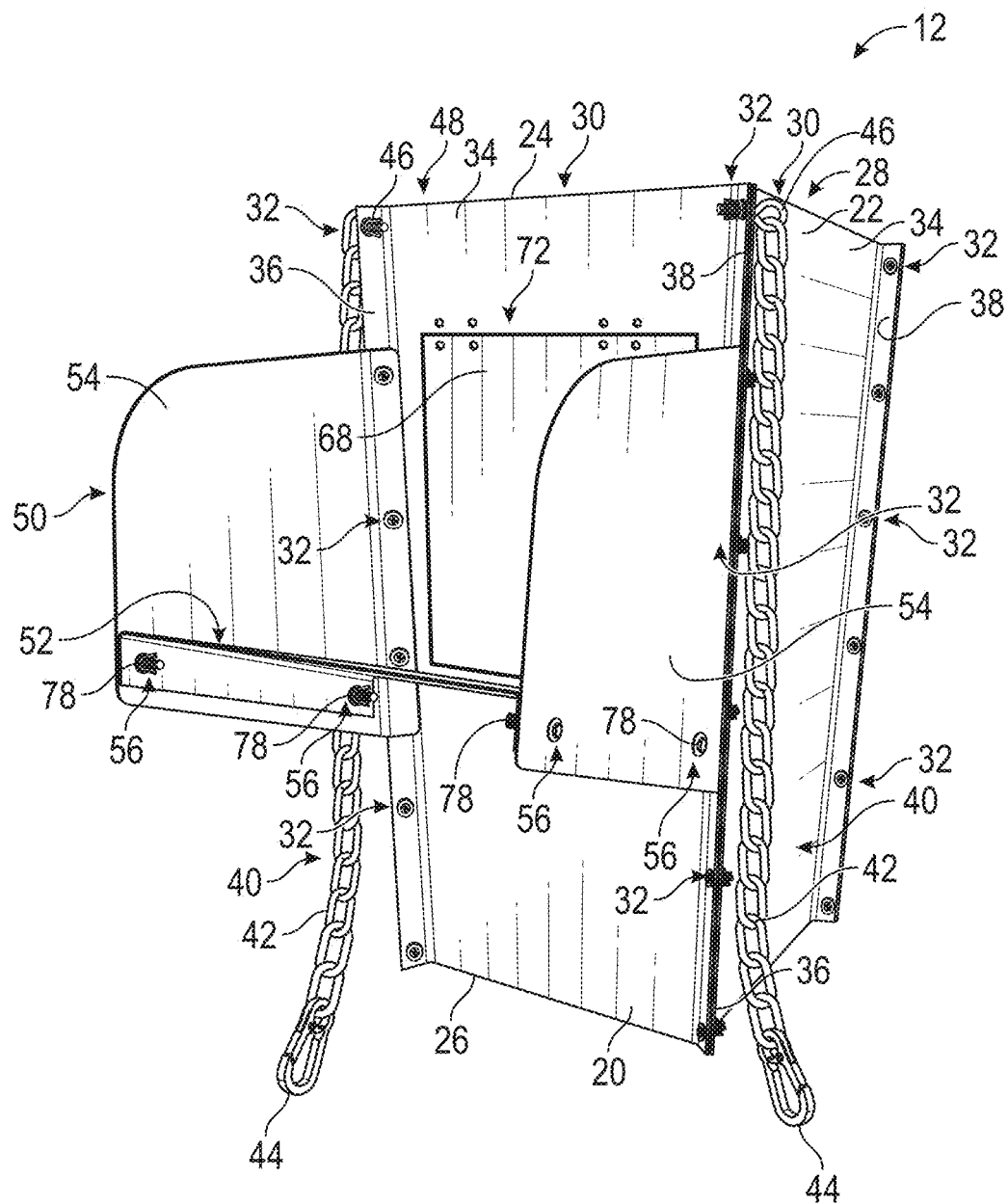
FIG. 5 is a perspective view of a hopper section of an embodiment of the disclosure.
Figure 6:
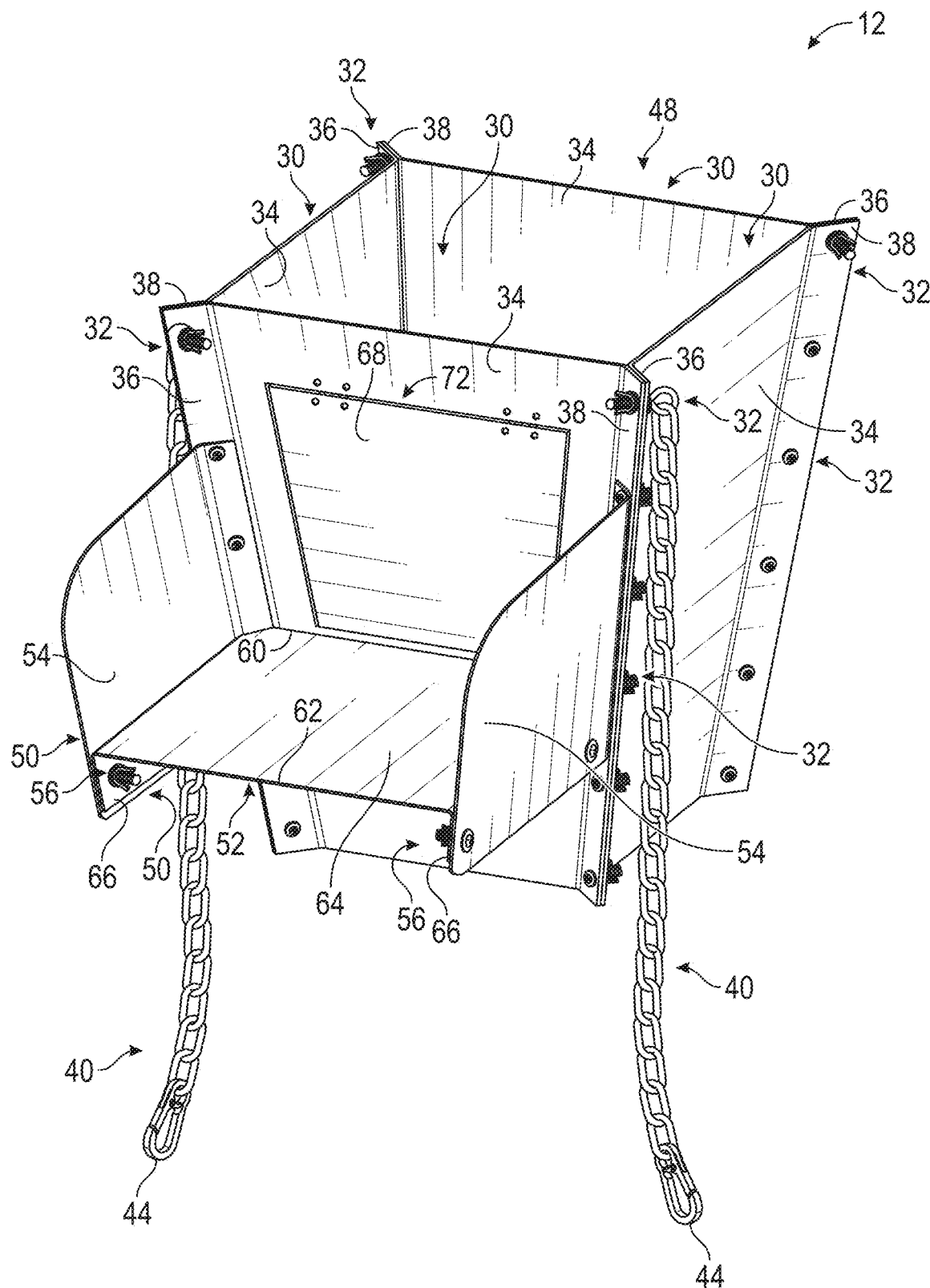
FIG. 6 is a perspective view of a hopper section of an embodiment of the disclosure.
Figure 7:
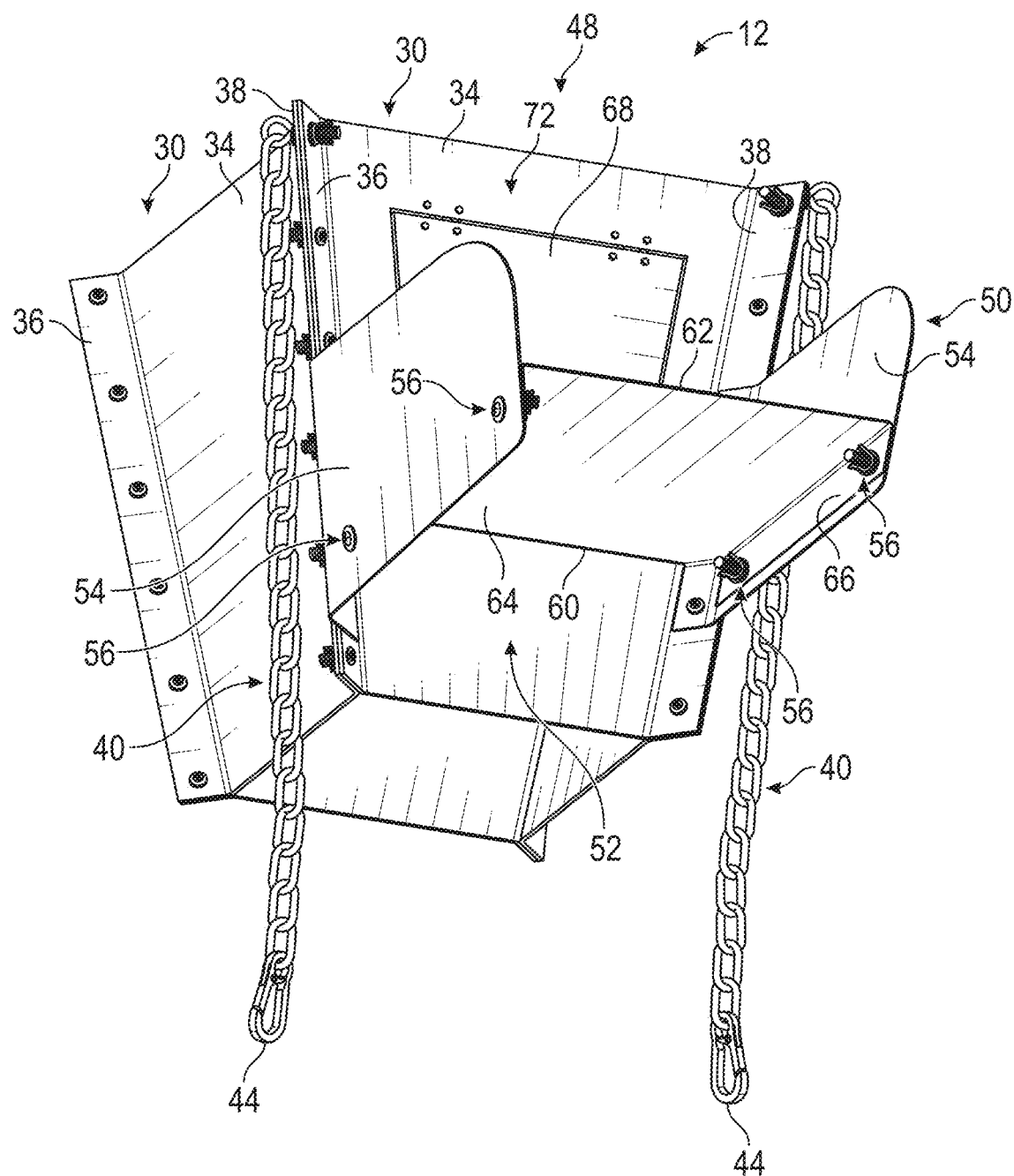
FIG. 7 is a perspective view of a hopper section of an embodiment of the disclosure.
Figure 8:
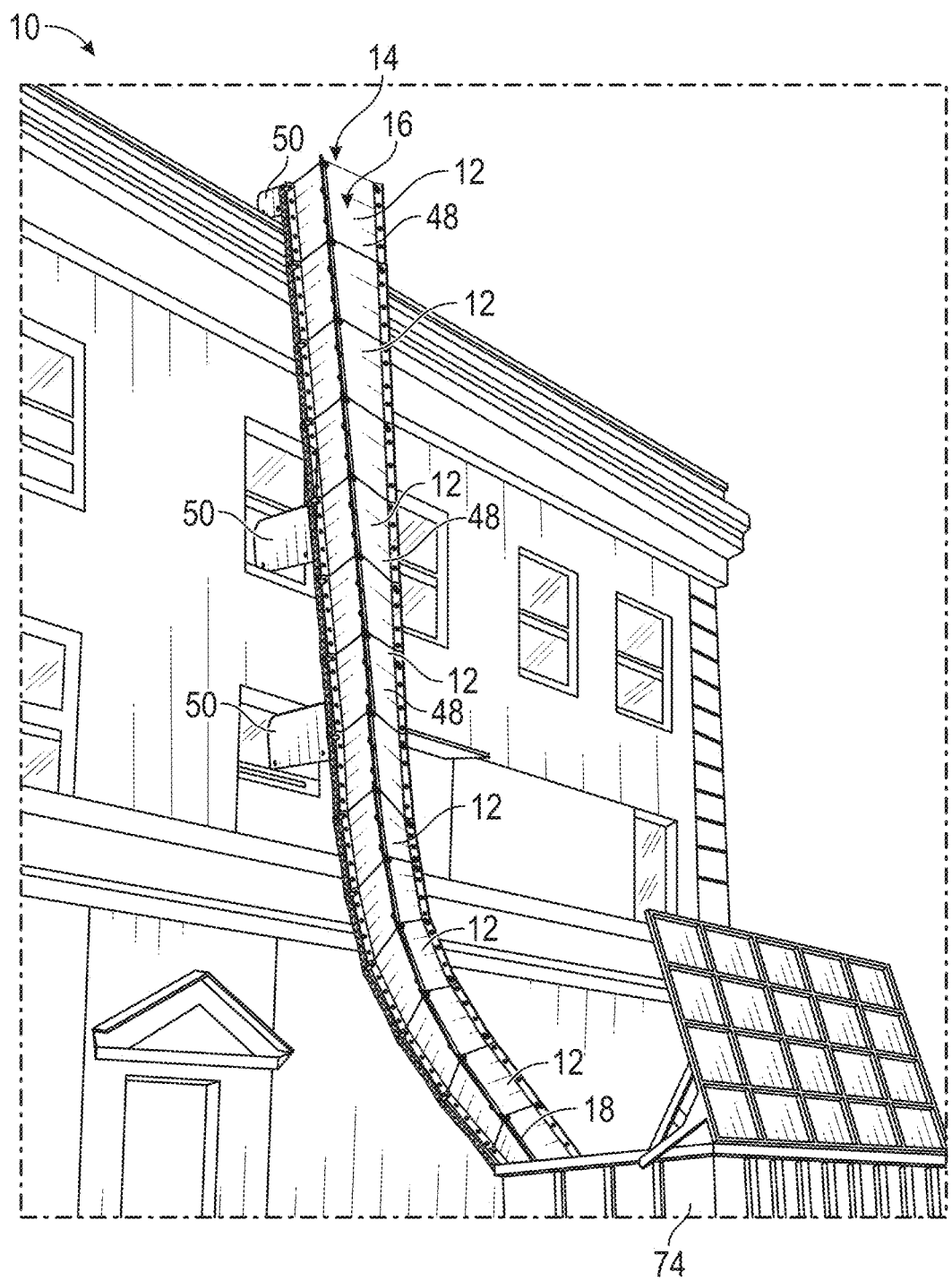
FIG. 8 is an in-use view of an embodiment of the disclosure.
Figure 9:
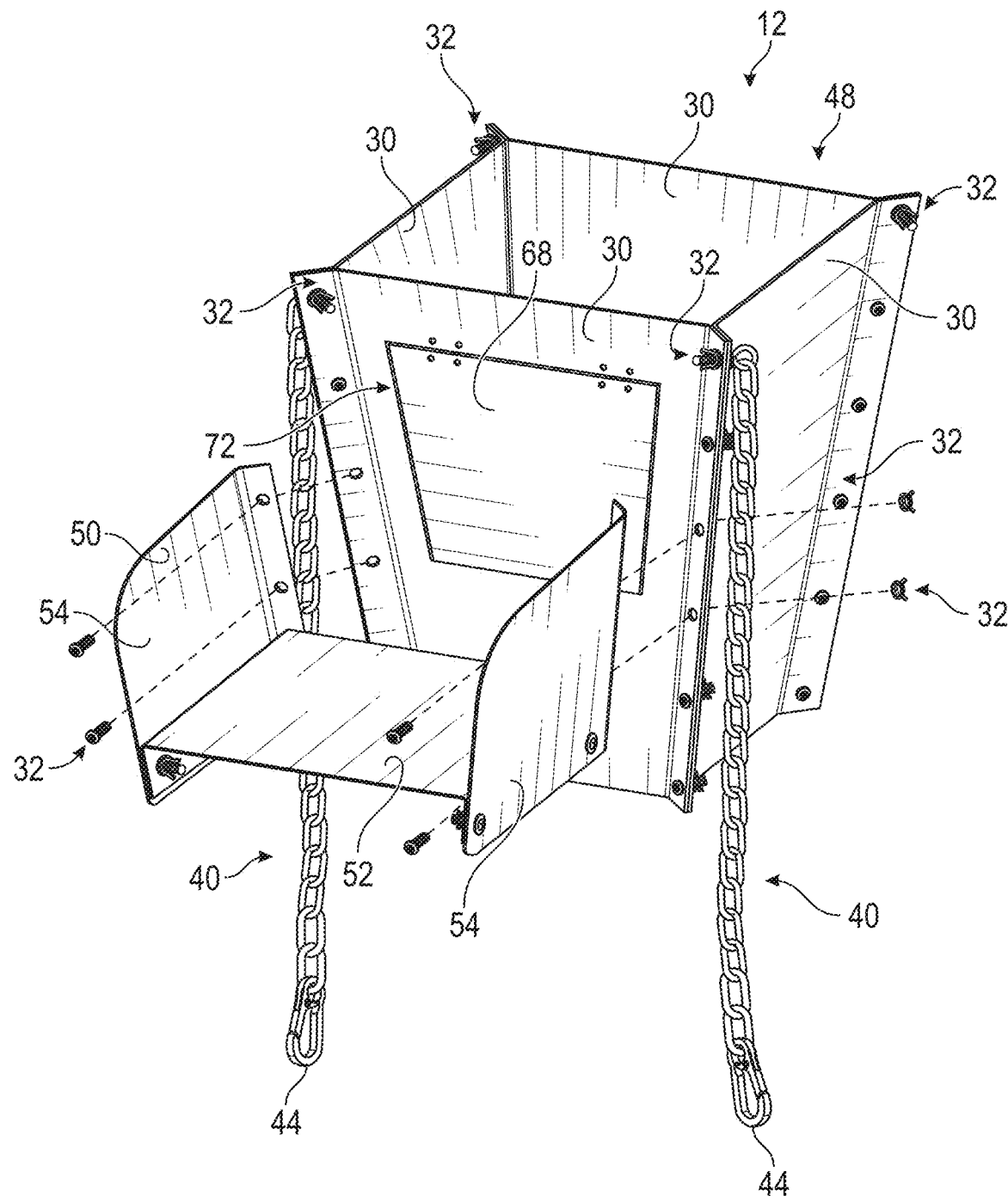
FIG. 9 is an exploded view of a hopper section of an embodiment of the disclosure.
Figure 10:
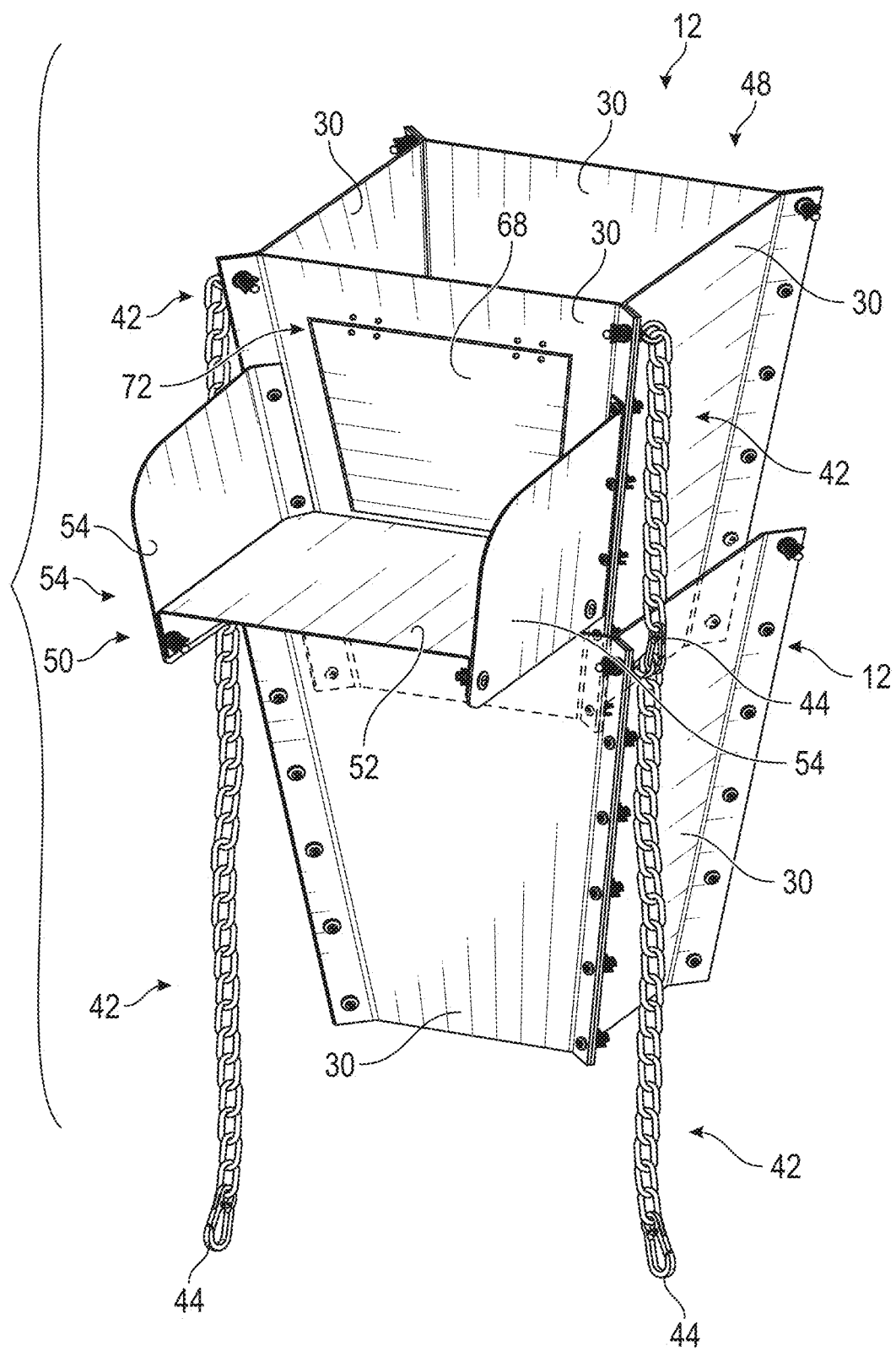
FIG. 10 is a perspective assembled view of a chute section of and a hopper section of an embodiment of the disclosure.
Figure 11:
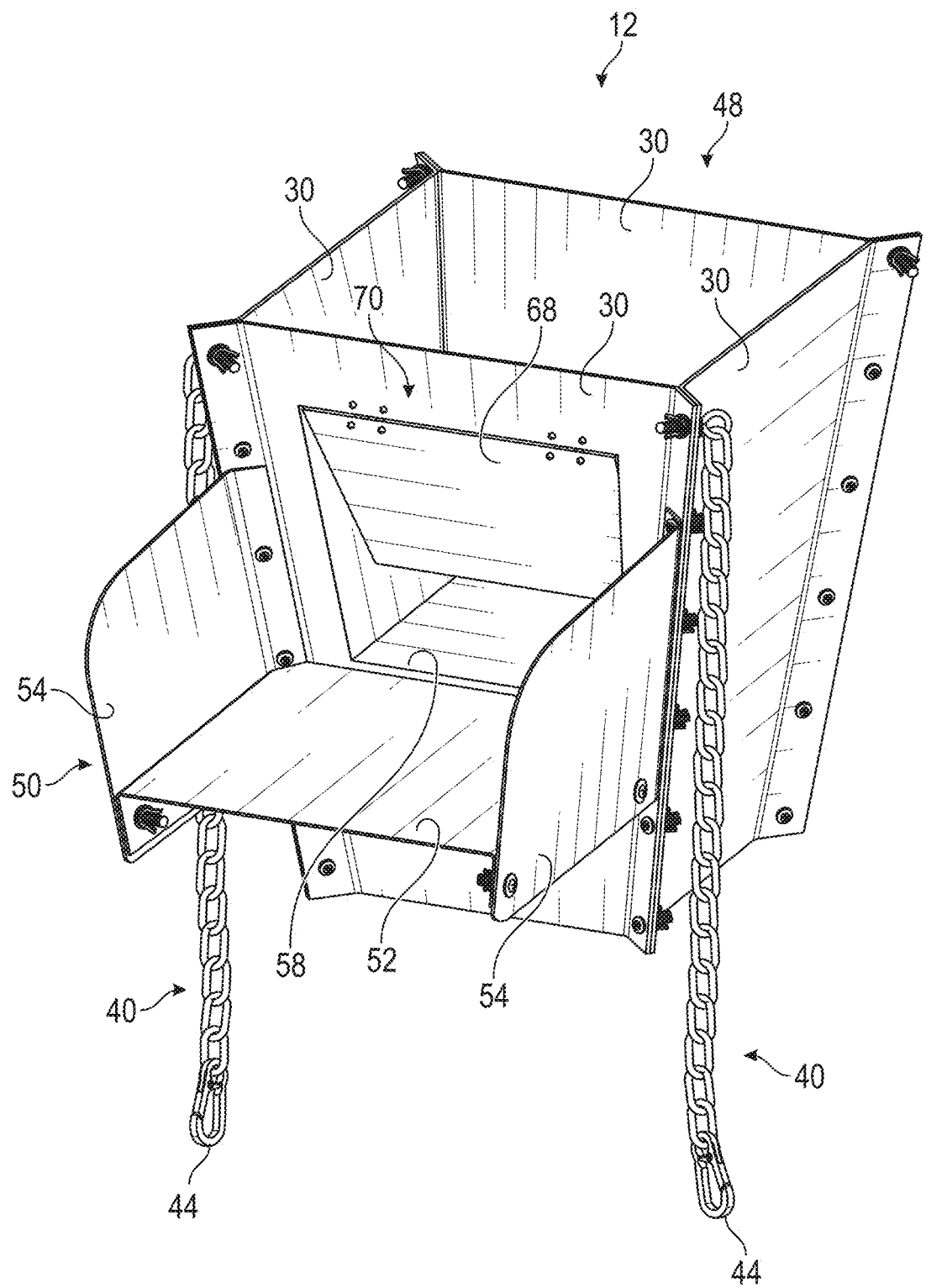
FIG. 11 is a perspective view of a hopper section of an embodiment of the disclosure.

With reference now to the drawings, and in particular to FIGS. 1 through 11 thereof, a new chute device embodying the principles and concepts of an embodiment of the disclosure and generally designated by the reference numeral 10 will be described.

As best illustrated in FIGS. 1 through 11, the disposal chute assembly 10 generally comprises a plurality of chute sections 12. Each chute section 12 has a tubular shape, and the chute sections 12 are removably interconnected such that the chute sections 12 define a channel 14 extending from a topmost chute section 16 to a bottommost chute section 18. A bottom portion 20 of each chute section 12 except the bottommost chute section 18 is received into a top portion 22 of an adjacent chute section 12. Each chute section 12 has a top end 24 and a bottom end 26 and tapers from the top end 24 to the bottom end 26.

Each chute section 12 comprises a tube 28 comprising a plurality of panels 30 that are removably interconnected by a plurality of connectors 32. Each panel 30 of the plurality of panels 30 extends from the top end 24 to the bottom end 26 of the chute section 12. Each panel 30 comprises a body 34, a first flange 36, and a second flange 38, in which the body 34 is coupled to and extends between the first and second flanges 36, 38. The first and second flanges 36, 38 extend from the body 34 outwardly with respect to the channel 14. The body 34 has a planar shape. There are four panels 30, the bodies 34 of which have trapezoidal shapes such that a cross-section of the channel 14 is a square shape. However, the body 34 of each panel 30 may have alternative shapes to form a channel 14. For example, the panels 30 of each chute section 12 may be shaped such that the cross-section of the channel 14 is circular. The chute sections 12 may include a different number of panels 30 and different chute sections 12 may have different shapes to each other.

Each connector 32 of the plurality of connectors 32 releasably couples a pair of adjacent panels 30 of the plurality of panels 30 together and comprises a nut and bolt assembly 76. Each connector 32 couples the first flange 36 of one of the pair of adjacent panels 30 to the second flange 38 of another of the pair of adjacent panels 30.

A pair of hoisting lines 40 is coupled to the tube 28, where each hoisting line 40 is coupled adjacent to a top end 24 of the tube 28. Each hoisting line 40 of the pair of hoisting lines 40 comprises a chain 42 but may include a cord, rope, strap, or the like. Each one of a pair of clasps 44 is coupled to a free end of an associated hoisting line 40 of the pair of hoisting lines 40. The plurality of connectors 32 includes a pair of eyebolt assemblies 46 positioned adjacent to the top end 24 of the tube 28, and each hoisting line 40 is coupled to the tube 28 via an associated one of the pair of eyebolt assemblies 46. Each clasp 44 of the pair of clasps 44 of each chute section 12 of the plurality of chute sections 12 except the bottommost chute section 18 is operable to releasably attach to one of the pair of eyebolt assemblies 46 of the adjacent chute section 12.

The plurality of chute sections 12 includes at least one hopper section 48, the tube 28 of which has an opening 58 which extends through the tube 28 into the channel 14. The at least one hopper section 48 comprises a hopper 50 coupled to the tube 28. The hopper 50 comprises a ramp 52 and a pair of sidewalls 54. The ramp 52 is positioned between the pair of sidewalls 54, and a plurality of fasteners 56 releasably couple the ramp 52 to each sidewall 54. The ramp 52 is positioned adjacently below the opening 58 and extends away from the tube 28. The ramp 52 is angled upwardly from a proximal end 60 to a distal end 62 of the ramp 52 with respect to the tube 28.

The ramp 52 includes an inclined wall 64 and a pair of flange walls 66, in which the inclined wall 64 is coupled to and extends between the pair of flange walls 66. Each sidewall 54 is coupled to a respective one of the pair of flange walls 66. The hopper 50 is coupled to the tube 28 by a portion of the plurality of connectors 32 which simultaneously releasably couple the pair of sidewalls 54 to the tube 28 and releasably couple adjacent panels 30 of the plurality of panels 30 of the tube 28. Each fastener 56 of the plurality of fasteners 56 is coupled to an associated one of the pair of flange walls 66 and comprises a nut and bolt assembly 78. The nut and bolt assembly 78 of each fastener 56 may be equivalent in size and shape to the nut and bolt assembly 76 of each connector 32.

A door 68 is coupled to the tube 28 and is movable between an open position 70 and a closed position 72 with respect to the opening 58. The door 68 is biased toward the closed position 72 and is pivotable inwardly with respect to the channel 14. The door 68 is biased via a gravitational force, but springs or other biasing elements may be implemented.

In use, the disposal chute assembly 10 is positioned in a construction site or other area where it is desirable to transfer debris downwardly through the channel 14 of the disposal chute assembly 10 to a destination area such as a dumpster 74, a dump truck, or the like. When one of the panels 30 of one of the chute sections 12 becomes damaged so that debris is no longer able to be contained within the channel 14 during conveyance to the destination area, the damaged panel 30 is replaced rather than replacing an entire chute section 12. The connectors 32 holding the damaged panel 30 are removed and used again to releasably couple a replacement panel 30 to other panels 30 on the damaged chute section 12. The inclined wall 64 and each sidewall 54 of the hopper 50 of each hopper section 48 are also releasable from each other and from the tube 28 of the associated tube 28 so that the inclined wall 64 and each sidewall 54 is individually replaceable, and each hopper 50 is reusable if the panel 30 to which the hopper 50 was attached is replaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A disposal chute assembly comprising a plurality of chute sections being removably interconnected, each chute section of the plurality of chute sections having a tubular shape and being positioned to define a channel extending from a topmost chute section to a bottommost chute section, each chute section having a top end and a bottom end, each chute section of the plurality of chute sections comprising a tube comprising a plurality of panels being removably interconnected, each panel of the plurality of panels extending from the top end to the bottom end of the chute section, wherein each panel of the plurality of panels of each chute comprises a body, a first flange, and a second flange, the body being coupled to and extending between the first and second flanges, the first and second flanges extending from the body outwardly with respect to the channel.

2. The assembly of claim 1, wherein a bottom portion of each chute section of the plurality of chute sections except the bottommost chute section is received into a top portion of an adjacent chute section of the plurality of chute sections.

3. The assembly of claim 1, wherein each chute section tapers from the top end to the bottom end.

4. The assembly of claim 1, further comprising:
a bottom portion of each chute section of the plurality of chute sections except the bottommost chute section being received into a top portion of an adjacent chute section of the plurality of chute sections, each chute section having a top end and a bottom end and tapering from the top end to the bottom end, each chute section of the plurality of chute sections comprising:
the body having a planar shape;
a plurality of connectors, each connector of the plurality of connectors releasably coupling a pair of adjacent panels of the plurality of panels together, each connector comprising a nut and bolt assembly, each connector coupling the first flange of one of the pair of adjacent panels to the second flange of another of the pair of adjacent panels; and
a pair of hoisting lines being coupled to the tube, each hoisting line being coupled adjacent to a top end of the tube, each hoisting line of the pair of hoisting lines comprising a chain;
a pair of clasps, each clasp of the pair of clasps being coupled to a free end of an associated hoisting line of the pair of hoisting lines; and
wherein the plurality of connectors includes a pair of eyebolt assemblies positioned adjacent to the top end of the tube, each hoisting line being coupled to the tube via an associated one of the pair of eyebolt assemblies;
wherein each clasp of the pair of clasps of each chute section of the plurality of chute sections except the bottommost chute section is operable to releasably attach to one of the pair of eyebolt assemblies of the adjacent chute section; and
wherein the plurality of chute sections includes at least one hopper section, the tube of the at least one hopper section extending through the tube into the channel, the at least one hopper section includes a hopper being coupled to the tube, the hopper comprising:
a ramp being positioned adjacently below the opening, the ramp extending away from the tube, the ramp being angled upwardly from a proximal end to a distal end of the ramp with respect to the tube, the ramp including an inclined wall and a pair of flange walls, the inclined wall being coupled to and extending between the pair of flange walls;
a pair of sidewalls attached to the ramp, the ramp being positioned between the pair of sidewalls, each sidewall being coupled to a respective one of the pair of flange walls, a portion of the plurality of connectors releasably coupling the pair of sidewalls to the tube; and
a plurality of fasteners, each fastener of the plurality of fasteners releasably coupling the ramp to an associated one of the pair of sidewalls, each fastener of the plurality of fasteners being coupled to an associated one of the pair of flange walls, each fastener of the plurality of fasteners comprising a nut and bolt assembly; and
a door being coupled to the tube and being movable between an open position and a closed position with respect to the opening, the door being biased toward the closed position, the door being pivotable inwardly with respect to the channel.

5. The assembly of claim 1, wherein the body of each panel of the plurality of panels has a planar shape.

6. The assembly of claim 1, wherein each chute section of the plurality of chute sections further comprises a plurality of connectors, each connector of the plurality of connectors releasably coupling a pair of adjacent panels of the plurality of panels together.

7. The assembly of claim 6, wherein each connector comprises a nut and bolt assembly, each connector coupling the first flange of one of the pair of adjacent panels to the second flange of another of the pair of adjacent panels.

8. The assembly of claim 1, wherein each chute section of the plurality of chute sections further comprises a pair of hoisting lines being coupled to the tube, each hoisting line being coupled adjacent to a top end of the tube.

9. The assembly of claim 8, wherein each hoisting line of the pair of hoisting lines comprises a chain.

10. The assembly of claim 8, wherein each chute section of the plurality of chute sections further comprises a pair of clasps, each clasp of the pair of clasps being coupled to a free end of an associated hoisting line of the pair of hoisting lines.

11. The assembly of claim 8, wherein the plurality of connectors includes a pair of eyebolt assemblies positioned adjacent to the top end of the tube, each hoisting line being coupled to the tube via an associated one of the pair of eyebolt assemblies.

12. The assembly of claim 11, wherein each chute section of the plurality of chute sections further comprises a pair of clasps, each clasp of the pair of clasps being coupled to a free end of an associated hoisting line of the pair of hoisting lines, wherein each clasp of the pair of clasps of each chute section of the plurality of chute sections except the bottommost chute section is operable to releasably attach to one of the pair of eyebolt assemblies of the adjacent chute section.

13. The assembly of claim 1, wherein the plurality of chute sections includes at least one hopper section, the tube of the at least one hopper section extending through the tube into the channel, the at least one hopper section including a hopper being coupled to the tube, the hopper comprising a ramp being positioned adjacently below the opening, the ramp extending away from the tube, the ramp being angled upwardly from a proximal end to a distal end of the ramp with respect to the tube.

14. A disposal chute assembly comprising:
a plurality of chute sections being removably interconnected, each chute section of the plurality of chute sections having a tubular shape and being positioned to define a channel extending from a topmost chute section to a bottommost chute section, each chute section having a top end and a bottom end, each chute section of the plurality of chute sections comprising a tube comprising a plurality of panels being removably interconnected, each panel of the plurality of panels extending from the top end to the bottom end of the chute section;
wherein the plurality of chute sections includes at least one hopper section, the tube of the at least one hopper section extending through the tube into the channel, the at least one hopper section including a hopper being coupled to the tube, the hopper comprising a ramp being positioned adjacently below the opening, the ramp extending away from the tube, the ramp being angled upwardly from a proximal end to a distal end of the ramp with respect to the tube; and
wherein the at least one hopper section further comprises a pair of sidewalls attached to the ramp, the ramp being positioned between the pair of sidewalls.

15. The assembly of claim 14, wherein the at least one hopper section further comprises a plurality of fasteners, each fastener of the plurality of fasteners releasably coupling the ramp to an associated one of the pair of sidewalls.

16. The assembly of claim 15, wherein the ramp includes an inclined wall and a pair of flange walls, the inclined wall being coupled to and extending between the pair of flange walls, each sidewall being coupled to a respective one of the pair of flange walls, each fastener of the plurality of fasteners being coupled to an associated one of the pair of flange walls, each fastener of the plurality of fasteners comprising a nut and bolt assembly.

17. The assembly of claim 14, wherein a portion of the plurality of connectors releasably couples the pair of sidewalls to the tube.

18. A disposal chute assembly comprising:

a plurality of chute sections being removably interconnected, each chute section of the plurality of chute sections having a tubular shape and being positioned to define a channel extending from a topmost chute section to a bottommost chute section, each chute section having a top end and a bottom end, each chute section of the plurality of chute sections comprising a tube comprising a plurality of panels being removably interconnected, each panel of the plurality of panels extending from the top end to the bottom end of the chute section;

wherein the plurality of chute sections includes at least one hopper section, the tube of the at least one hopper section extending through the tube into the channel, the at least one hopper section including a hopper being coupled to the tube, the hopper comprising a ramp being positioned adjacently below the opening, the ramp extending away from the tube, the ramp being angled upwardly from a proximal end to a distal end of the ramp with respect to the tube; and a door being coupled to the tube and being movable between an open position and a closed position with respect to the opening, the door being biased toward the closed position.

19. The assembly of claim 18, wherein the door is pivotable inwardly with respect to the channel.

* * * * *